(No Model.) 2 Sheets—Sheet 1.
H. G. PRESTON.
FLY BOOK.
No. 461,921. Patented Oct. 27, 1891.
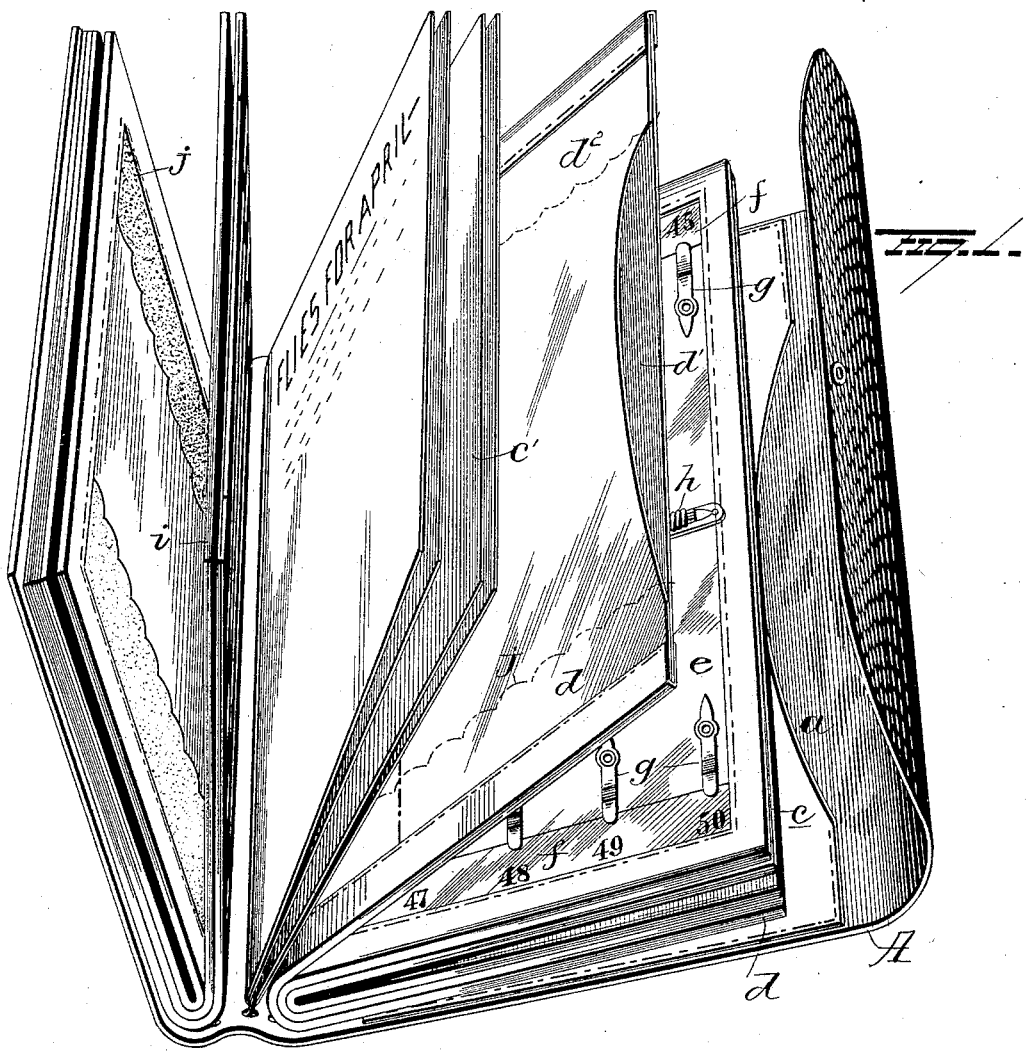
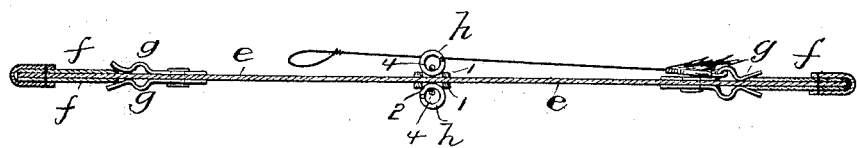

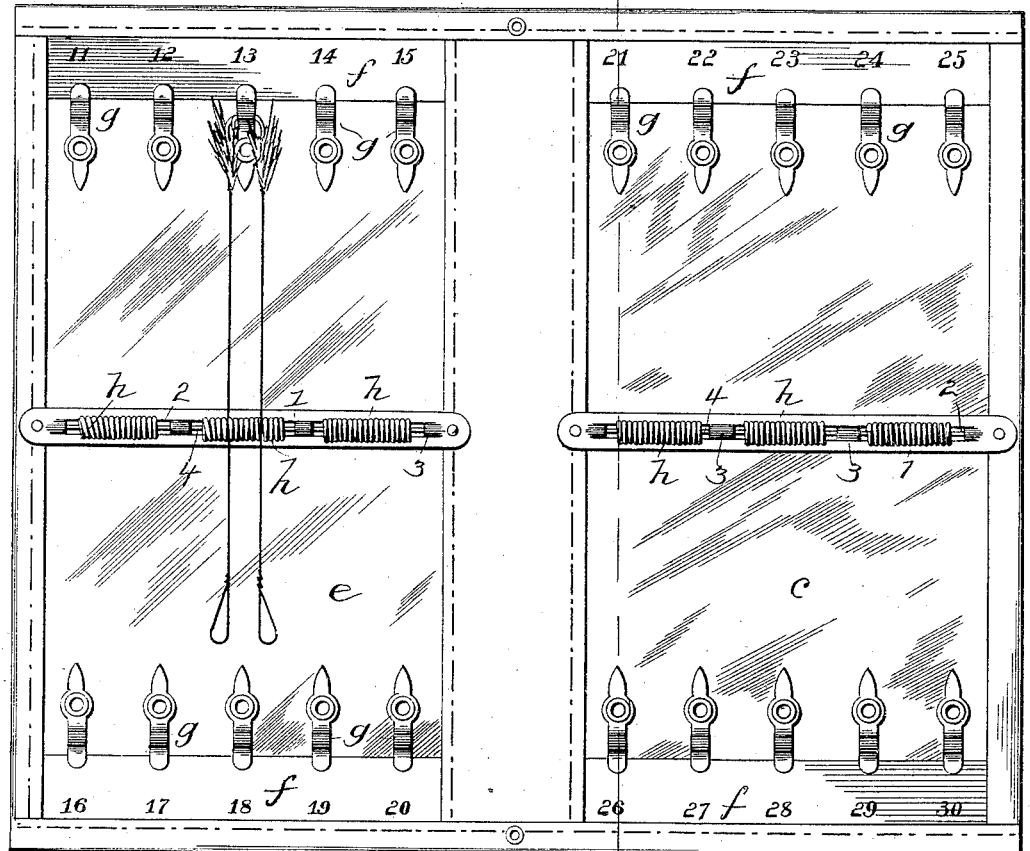

UNITED STATES PATENT OFFICE.

HENRY G. PRESTON, OF BROOKLYN, NEW YORK.

FLY-BOOK.

SPECIFICATION forming part of Letters Patent No. 461,921, dated October 27, 1891.

Application filed May 20, 1891. Serial No. 393,442. (No model.)

*To all whom it may concern:*

Be it known that I, HENRY G. PRESTON, a citizen of Brooklyn, in the county of Kings and State of New York, have invented certain new and useful Improvements in Fly-Books; and I do hereby declare the following to be a full, clear, and exact description of the invention, such as will enable others skilled in the art to which it appertains to make and use the same.

My invention relates to an improvement in fly-books for containing artificial flies for fishing; and it consists in certain novel features of construction and combinations and arrangements of parts, as hereinafter set forth, and pointed out in the claims.

In the accompanying drawings, Figure 1 is a view of my improved fly-book. Fig. 2 is a separate view of one of the leaves. Fig. 3 is a section on the line $x$ $x$ of Fig. 2.

A represents the cover of the book, which may be of leather similar to that of a pocket-book, and is preferably provided with pockets $a$ and a suitable clasp. The leaves of the book may be made in two (more or less) sets $c$, and between these sets of leaves a series of leaves or charts $c'$ are located and have printed thereon descriptions of various flies, said descriptions being arranged to designate what flies are proper to be used for different months, and each description being numbered, said numbers referring to numbered hooks or stays on other leaves of the book, as presently explained. The first and last leaf $d$ of each series $c$ of the leaves may be made of parchment or parchment-paper, bound at top and bottom with leather, and made with a pocket $d'$ for the reception of loose material for making artificial flies or for other purpose. These leaves $d$ may also have secured to them soft material $d^2$ for the reception of fish-hooks or for other purpose. Arranged next to the leaves $d$ are leaves $e$, preferably of celluloid, bound with leather, and provided at top and bottom on each side with strips $f$, containing figures, said figures referring to hooks $g$, secured to said leaves $e$ at top thereof. These hooks or stays $g$ are adapted for the reception of hooks containing artificial flies, each hook or stay $g$ being intended for the reception of a particular fly, and the number of each hook or stay $g$ being referable to the corresponding number in the chart for a description of each particular fly.

In order to prevent the tangling of the snells of the several hooks, springs $h$ are located in the center of the pages or leaves $e$ for the reception of said snells. In attaching these springs to the leaves a plate 1 is secured to each side thereof and provided with a series of slots 2 and ears 3. Secured at its ends to the ends of the plate 1, and passing loosely through the ears 3, is a rod or wire 4, and loosely located on this rod or wire between the ears 3 are the springs $h$.

Between the leaves $e$ for receiving the hooks with the flies thereon are leaves $i$, said leaves $i$ being preferably composed of a layer of leather and a layer of flannel or similar material, and also with flaps $j$.

Having fully described my invention, what I claim as new, and desire to secure by Letters Patent, is—

1. A fly-book having leaves provided with hooks or stays, each hook or stay being numbered, and a chart descriptive of flies for fishing secured thereto, each description being numbered and referable to the numbered hooks or stays, substantially as set forth.

2. The combination, with the leaf of a fly-book made of celluloid, of a series of stays arranged on said leaf, a strip containing a number for each stay, and springs attached to said leaf and adapted to receive the snells of the hooks connected to said hooks or stays on the leaf, substantially as set forth.

3. In a fly-book, the combination, with two or more series of leaves, each series of leaves comprising leaves adapted to receive fish-hooks with artificial flies thereon, each of said fish-hooks being provided with a number on the page of said book and each series of pages comprising pocketed leaves and leaves of soft material, of a series of leaves containing a description of various artificial flies and referable by number to said flies as they are located in the book, substantially as set forth.

In testimony whereof I have signed this specification in the presence of two subscribing witnesses.

HENRY G. PRESTON.

Witnesses:
JOHN J. MANNING,
WALTER F. LANIGAN.